US012768976B2

(12) United States Patent
Kubota et al.

(10) Patent No.: US 12,768,976 B2
(45) Date of Patent: Oct. 20, 2026

(54) SIGNAL PROCESSING DEVICE, RADAR DEVICE, SIGNAL PROCESSING METHOD, AND RECORDING MEDIUM

(71) Applicant: FURUNO ELECTRIC CO., LTD., Hyogo (JP)

(72) Inventors: Yugo Kubota, Hyogo (JP); Hironori Takahashi, Hyogo (JP)

(73) Assignee: FURUNO ELECTRIC CO., LTD., Hyogo (JP)

( * ) Notice: Subject to any disclaimer, the term of this patent is extended or adjusted under 35 U.S.C. 154(b) by 435 days.

(21) Appl. No.: 18/085,520

(22) Filed: Dec. 20, 2022

(65) Prior Publication Data

US 2023/0236304 A1 Jul. 27, 2023

(30) Foreign Application Priority Data

Jan. 27, 2022 (JP) ................................ 2022-010570

(51) Int. Cl.
*H04B 17/318* (2015.01)
*G01S 13/42* (2006.01)

(52) U.S. Cl.
CPC .......... *G01S 13/426* (2013.01); *H04B 17/318* (2015.01)

(58) Field of Classification Search
CPC ........ G01S 13/426; G01S 7/38; G01S 7/4021; G01S 13/917; G01S 13/937; H04B 17/318
See application file for complete search history.

(56) References Cited

U.S. PATENT DOCUMENTS

2004/0041724 A1* 3/2004 Levitan .................. F41H 13/00 342/52
2012/0007766 A1 1/2012 Maeno
2012/0007767 A1 1/2012 Maeno
2013/0342382 A1* 12/2013 Maeno ................ G01S 13/5246 342/93
2020/0333451 A1 10/2020 Wei et al.

FOREIGN PATENT DOCUMENTS

JP 2857681 2/1999
JP 2012112672 6/2012
JP 2014025916 2/2014
JP 2016206153 12/2016
JP 2016206153 A * 12/2016
JP 2018200176 12/2018

OTHER PUBLICATIONS

"Search Report of Europe Counterpart Application", issued on Jun. 14, 2023, p. 1-p. 13.

* cited by examiner

*Primary Examiner* — Timothy A Brainard
*Assistant Examiner* — Bongani Jabulani Mashele
(74) *Attorney, Agent, or Firm* — JCIPRNET

(57) ABSTRACT

According to the disclosure, an increase in costs is suppressed and the influence of main bang is reduced. A signal processing device includes a hardware processor programmed to at least: calculate a correction value of strength for each of distances from an antenna based on a received signal including a signal acquired by multiple transmissions and receptions via the antenna; and suppress a level indicated by received data generated based on the received signal for each of the distances by using the correction value for each of the distances.

8 Claims, 7 Drawing Sheets

SIGNAL PROCESSING DEVICE, RADAR DEVICE, SIGNAL PROCESSING METHOD, AND RECORDING MEDIUM

CROSS-REFERENCE TO RELATED APPLICATION

This application claims the priority benefits of Japanese application no. 2022-010570, filed on Jan. 27, 2022. The entirety of the above-mentioned patent application is hereby incorporated by reference herein and made a part of this specification.

BACKGROUND

Technical Field

The disclosure relates to a signal processing device, a radar device, a signal processing method, and a recording medium.

Description of Conventional Art

In a device that transmits and receives radio waves, for example, when an antenna is configured for both transmission and reception, transmission signals tend to loop back to the receiving side. As a technology related to a main bang, which is this loop-back signal, for example, Patent Literature 1 (Japanese Patent No. 2857681) discloses a radar device as follows. That is, a radar device includes a transmission trigger pulse generator that generates a transmission trigger pulse which determines the timing of emission of a detection radio wave from an antenna; a sampling circuit that digitizes and captures a received signal obtained by receiving the reflected wave of the detection radio wave from a target with the antenna at a particular sampling period; a buffer memory configured to temporarily store received signal data for multiple beams sampled by the sampling circuit; an image memory configured to store the received signal data transferred from the buffer memory as image data; an address generation circuit configured to generate an address signal that writes the image data to the image memory and reads out the image data from the image memory; and a display such as a cathode-ray tube (CRT) configured to display the image data read out from the image memory as an image, in which the transmission trigger pulse generator is configured such that the output cycle of the transmission trigger pulse is different for each transmission trigger pulse. The radar device further includes an analog to digital (A/D) converter configured to digitize the received signal obtained by the antenna in response to the transmission trigger pulse from the transmission trigger pulse generator at the particular sampling period; a main bang detection memory configured to store the received signal data for multiple beams digitized by the A/D converter; a main bang detection circuit configured to detect a main bang included in the received signal data by taking a sweep correlation related to the received signal data for multiple beams stored in the main bang detection memory; and a start pulse generator configured to output a start pulse that starts sampling to the sampling circuit in response to the main bang detected by the main bang detection circuit.

In order to reduce the influence of the main bang, for example, a radar device is provided with a circuit that designates the timing and level and suppresses the received signal, and costs increase. Also, in some cases, if the setting of the timing configured to suppress the received signal is incorrect, the main bang may not be well suppressed. Moreover, in some cases, the echoes of targets existing in the vicinity of the antenna are erased.

SUMMARY

The purpose of the disclosure relates to a signal processing device, a radar device, a signal processing method, and a recording medium that are capable of suppressing an increase in costs and reducing the influence of the main bang.

A signal processing device according to one aspect of the disclosure includes a hardware processor programmed to at least: calculate a correction value of strength for each of distances from an antenna based on a received signal including a signal obtained by multiple transmissions and receptions via the antenna; and suppress a level indicated by received data generated based on the received signal for each of the distances by using the correction value for each of the distances.

According to the disclosure, the increase in costs can be suppressed and the influence of the main bang can be reduced.

DESCRIPTION OF THE EMBODIMENTS

Figure 1:
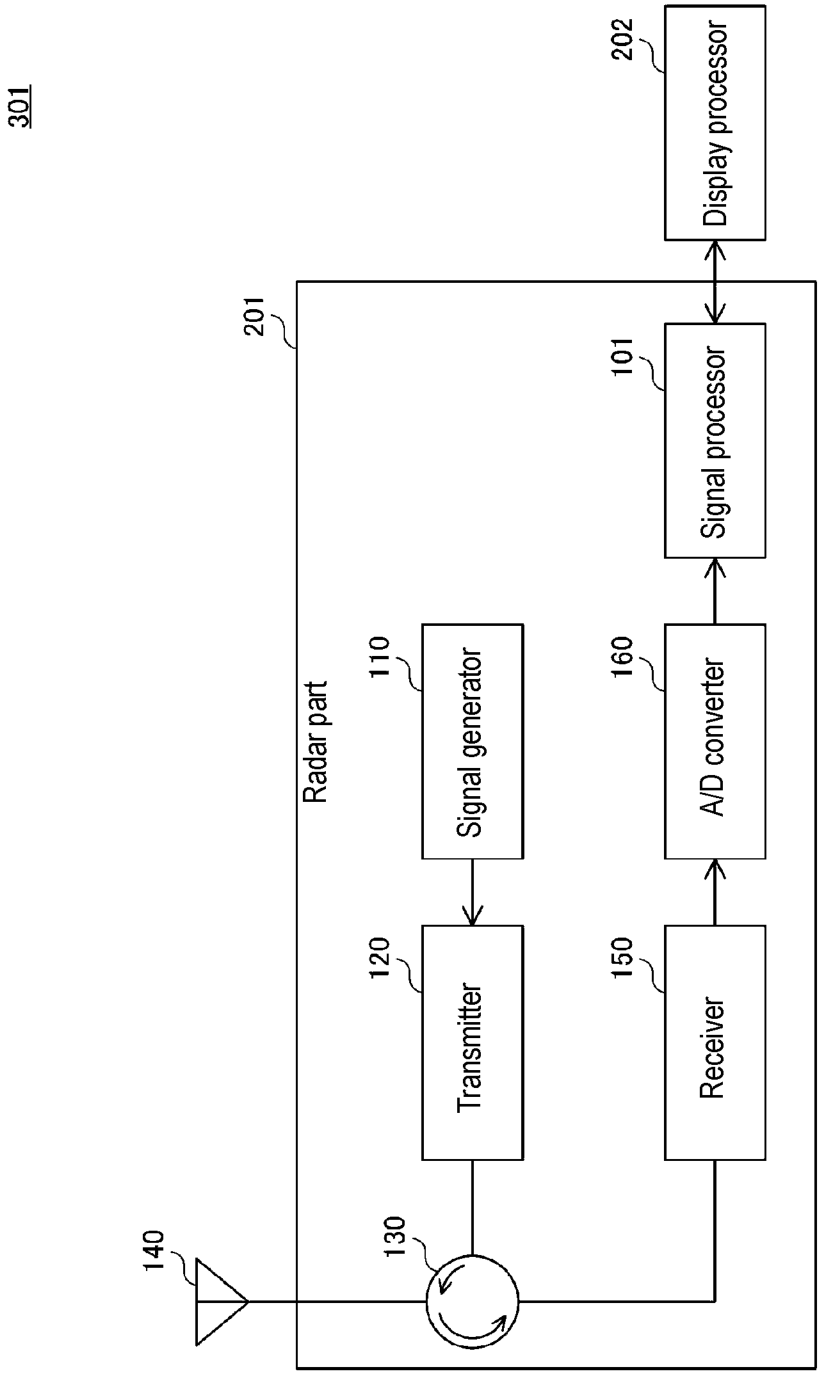
FIG. 1 is a diagram showing the configuration of a radar device according to an embodiment of the disclosure.

Embodiments of the disclosure will be described below with reference to the drawings. Further, the same or equivalent parts in the drawings are denoted by the same reference numerals, and the description thereof will not be repeated. Moreover, at least part of the embodiments described below may be combined as desired.

Configuration and Operation

FIG. 1 is a diagram showing the configuration of a radar device according to an embodiment of the disclosure.

Referring to FIG. 1, a radar device 301 is, for example, mounted on a ship, and includes a radar part 201 and a display processor 202. The radar device 301 transmits a transmission signal to a detection target area, which is an area to be monitored, and receives a reflected signal of the transmission signal as a received signal. And based on the received signal, the radar device 301 performs processing for displaying an echo image indicating the presence or absence of a target in the detection target area and the distance between the radar device 301 and the target on the display processor 202.

The radar part 201 includes a signal generator 110, a transmitter 120, a circulator 130, an antenna 140, a receiver 150, an analog to digital (A/D) converter 160, and a signal processor 101. The signal processor 101 is an example of a signal processing device.

The radar part 201 outputs echo data indicating a target detection result in the detection target area to the display processor 202. The antenna 140 rotates while emitting a radio wave in each particular sweep period T. In this way, the radar part 201 may detect targets present in all directions around the ship or the like.

The radar part 201 outputs echo data in multiple radiation directions of radio waves for each of the sweep periods T to the display processor 202. The radar part 201 repeats the scanning operation of rotating the antenna 140 by 360 degrees to obtain echo data in all directions.

The display processor 202 performs processing for displaying the echo image in the detection target area on a display device based on multiple pieces of echo data received from the radar part 201.

The signal generator 110 in the radar part 201 outputs, for example, a pulsed transmission trigger to the transmitter 120 in the sweep period T. For example, a magnetron or a solid-state element is configured to generate a transmission radio wave in the transmitter 120.

The transmitter 120 generates a transmission signal in a radio frequency (RF) band based on a transmission trigger received from the signal generator 110 in the sweep period T, and the transmission signal generated in the RF band is output in the radiation direction of the radio wave via the circulator 130 and the antenna 140.

The receiver 150 receives a signal including a reflected wave of the transmission signal transmitted from the antenna 140, that is, a reflected signal of the transmission signal reflected by the target. In addition to the reflected signal, the received signal may include a signal that is part of the transmission signal and directly reaches the receiver 150 without passing through the antenna. In the signal processor 101, received signals are acquired from multiple directions by rotating the antenna 140.

In more detail, the receiver 150 receives a reflected signal in the RF band, which is a signal in which the transmission signal transmitted from the antenna 140 is reflected by the target in the radiation direction of the radio wave, via the antenna 140 and the circulator 130. The receiver 150 detects and amplifies the received signal including the reflected signal received, and outputs the received signal to the A/D converter 160.

The A/D converter 160 converts the received signal, which is an analog signal received from the receiver 150, into received data, which is a digital signal by sampling at a particular sampling frequency to convert the received data into a digital signal, and outputs the received data to the signal processor 101 as echo data. Hereinafter, the operation in one of the sweep periods T as described above is also simply referred to as a "sweep".

The signal processor 101 performs correction processing, which is to be described later, on multiple echo data received from the A/D converter 160 over each of the sweep periods T, and outputs the echo data after correction processing to the display processor 202.

Figure 2:
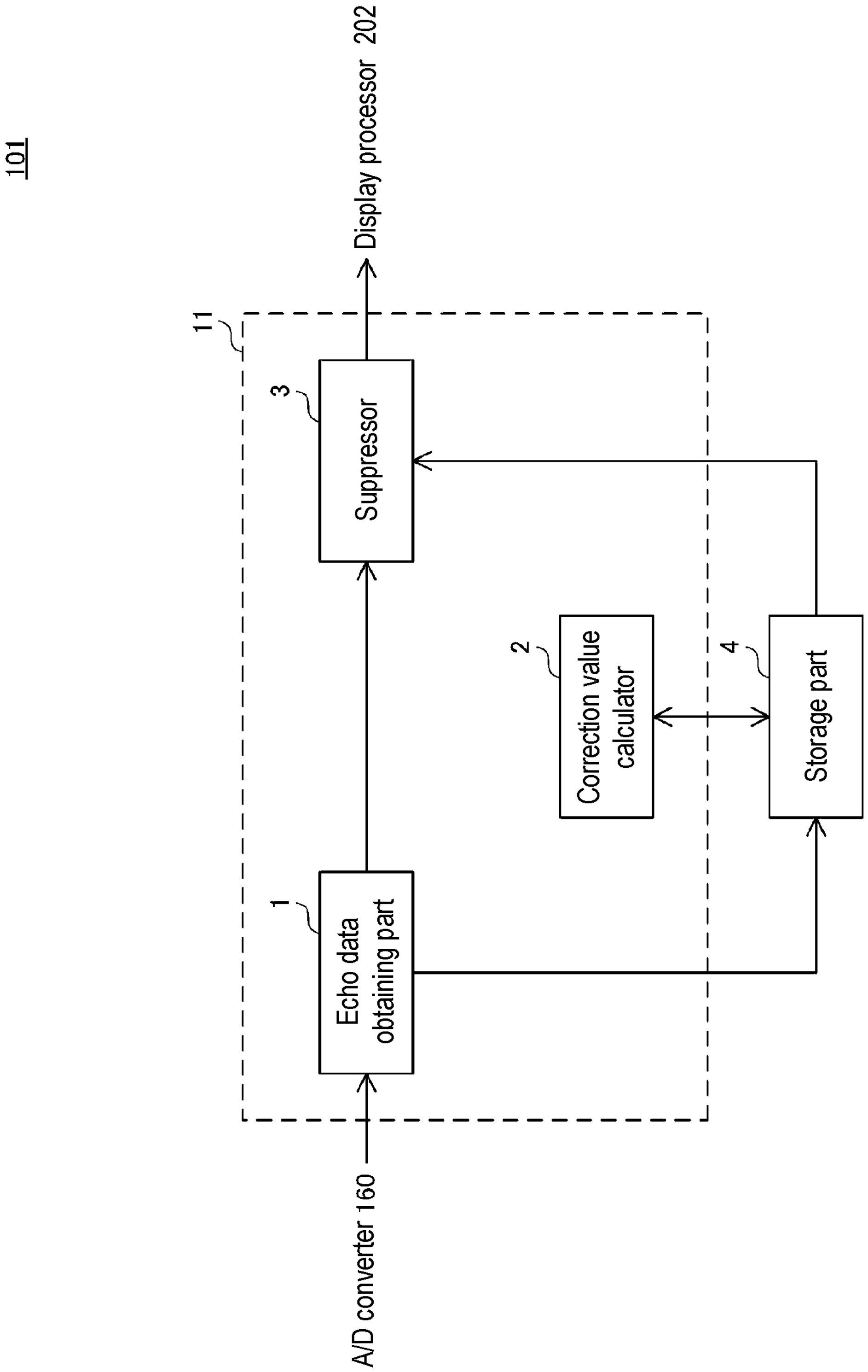
FIG. 2 is a diagram showing the configuration of the signal processor in the radar device according to the embodiment of the disclosure.

FIG. 2 is a diagram showing the configuration of the signal processor in the radar device according to the embodiment of the disclosure.

Referring to FIG. 2, the signal processor 101 includes a storage part 4 and a controller 11. The controller 11 includes an echo data obtaining part 1, a correction value calculator 2, and a suppressor 3. The controller 11 is, for example, a processing circuitry.

The echo data obtaining part 1 receives the echo data output from the A/D converter 160 and stores the echo data in the area of the corresponding sweep period T in the storage part 4.

The correction value calculator 2 calculates a correction value for the strength of the received signal acquired through multiple transmissions and receptions via the antenna 140, that is, the strength of the received signal received by the antenna 140 that rotates, for each distance D from the antenna 140 of the direction at which the transmission signal transmitted from the antenna 140 is reflected.

Figure 3:
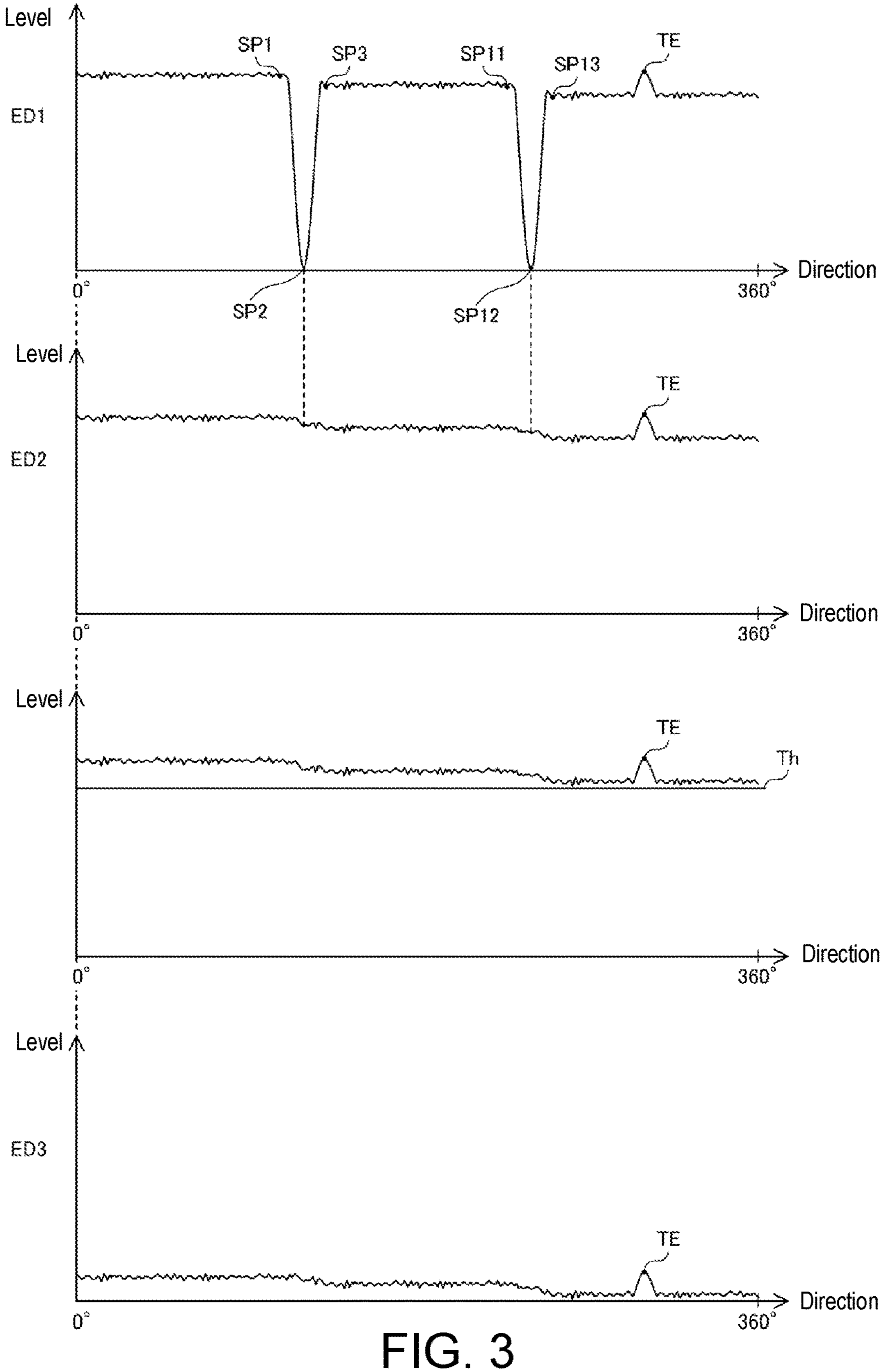
FIG. 3 is a diagram for explaining echo data correction processing performed by the signal processor according to the embodiment of the disclosure.

FIG. 3 is a diagram for explaining echo data correction processing performed by the signal processor according to the embodiment of the disclosure. In FIG. 3, the horizontal axis indicates the direction of the antenna 140, and the vertical axis indicates the echo data level. FIG. 3 shows echo data for one scanning operation, that is, one scan, at a certain distance from the antenna 140.

Referring to FIG. 3, while the peak of a target TE is obtained in echo data ED1 for one scan, in the echo data of sweeps SP2 and SP12 corresponding to two certain directions, missing where sufficient levels are not obtained occurs.

Figure 4:
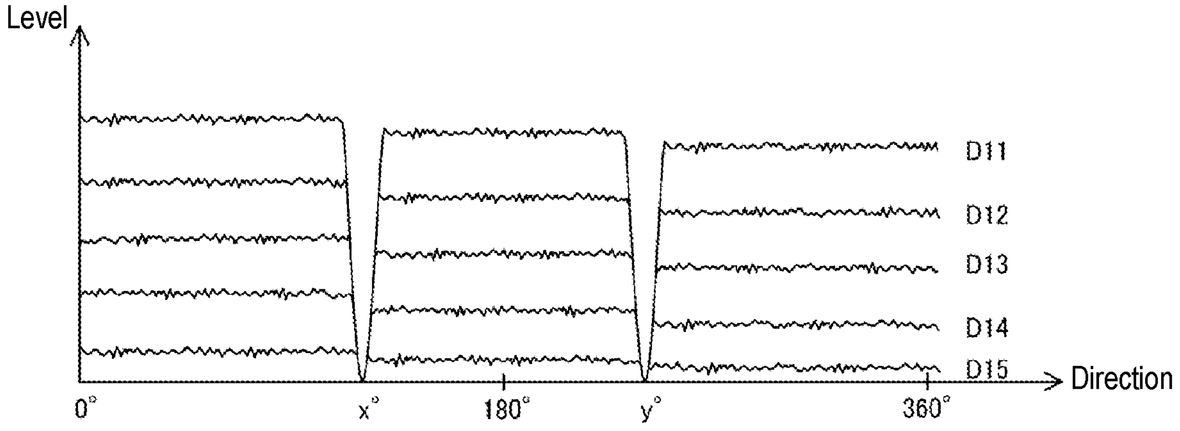
FIG. 4 is a diagram for explaining a state in which missing occurs in the radar device according to the embodiment of the disclosure.

FIG. 4 is a diagram for explaining a state in which missing occurs in the radar device according to the embodiment of the disclosure. In FIG. 4, the horizontal axis indicates the direction of the antenna 140, and the vertical axis indicates the echo data level.

For example, when a magnetron is used in the transmitter 120, the magnetron may rarely fail to output a pulsed signal.

In FIG. 4, the missing occurs at the directions x° and y° of the antenna 140, and the echo data levels corresponding to respective distances D11 to D15 from the antenna 140 are zero.

Referring to FIG. 2 again, in order to prevent the influence of missing, the correction value calculator 2 performs statistical processing of the level indicated by the received data (hereinafter also referred to as "reception level") for each of the distances D, and calculates a correction value by using results of the statistical processing. In more detail, the correction value calculator 2 performs statistical processing of the reception level in multiple directions including a target direction, which are part of all directions for one rotation of the antenna 140, for each of the distances D, and calculates a correction value for the target direction by using the results of the statistical processing.

For example, in the statistical processing, the correction value calculator 2 compares the level indicated by target data, which is the received data of the target, with the levels indicated by the received data of others of which received time is close, and replaces the level of the target data with the level higher than the level of the target data. In more detail, in the statistical processing, the correction value calculator 2 compares the level indicated by the target data, which is the received data in the target direction, with the levels indicated by the received data in other directions. That is, the correction value calculator 2 compares the level indicated by the target data, which is the received data, with other levels indicated by the received data in which the directions of the antenna 140 are different from the direction of the target data, for each of the distances D, replaces the level of the target data with another level that is higher than the level of the target data, and calculates the correction value by using the level replaced.

Specifically, for example, the correction value calculator 2 calculates the maximum value on both sides of a target sweep, that is, the sweeps of the direction one before and the direction one after, and let the maximum value of the reception level in the target sweep be the reception level of the target sweep.

In the example shown in FIG. 3, the correction value calculator 2 calculates the reception level of target sweep SP2 as well as the reception levels of sweep SP1 and sweep SP3 on both sides of the target sweep SP2, and replaces the reception level of the target sweep SP2 with the reception level of the sweep SP1 that has the maximum value. Further, the correction value calculator 2 calculates the reception level of target sweep SP12 as well as the reception levels of sweep SP11 and sweep SP13 on both sides of the target sweep SP12, and replaces the reception level of the target sweep SP12 with the reception level of the sweep SP11 that has the maximum value.

Therefore, echo data ED2 from which the influence of missing is removed may be obtained as shown in FIG. 3.

It should be noted that the correction value calculator 2 is not limited to the configuration in which the replacement is performed with the maximum value for three sweeps of the direction one before, the target direction, and the direction one after, the replacement may be performed in either one of the direction one before and the direction one after and the target direction, or the replacement may be performed using the level of a direction that is two or more away from the target direction. That is, the above-mentioned "the received data of others of which received time is close" may be data that is not adjacent to the target data in terms of time.

Then, for each of the distances D, the correction value calculator 2 obtains the minimum value of the level indicated by each of the received data obtained by the transmissions and the receptions via the antenna 140, that is, the levels indicated by the received data in all directions of rotation of the antenna 140, and calculates the minimum value or a value based on the minimum value as the correction value.

For example, the correction value calculator 2 sets the minimum reception level of the echo data ED2 in all directions as a threshold value Th, which is the correction value.

The suppressor 3 uses the correction value for each of the distances D to suppress the level indicated by the received data generated based on the received signal for each of the distances D.

Specifically, the suppressor 3 generates echo data ED3 by subtracting the threshold value Th from the reception levels of the echo data ED2 in all directions, and outputs the echo data ED3 to the display processor 202.

Therefore, it is possible to obtain the echo data ED3 in which the peak of the target TE existing in a specific direction is left and the effect of missing is removed.

It should be noted that the suppressor 3 is not limited to the configuration in which the calculation of subtracting the threshold value Th from the levels of the echo data ED2 is performed. Alternatively, in addition to this calculation, another calculation using the threshold value Th may be performed to suppress the level of the echo data ED2. Moreover, the suppressor 3 may be configured to subtract the threshold value Th from the level of the echo data ED1 instead of the echo data ED2 and output the result to the display processor 202.

Figure 5:
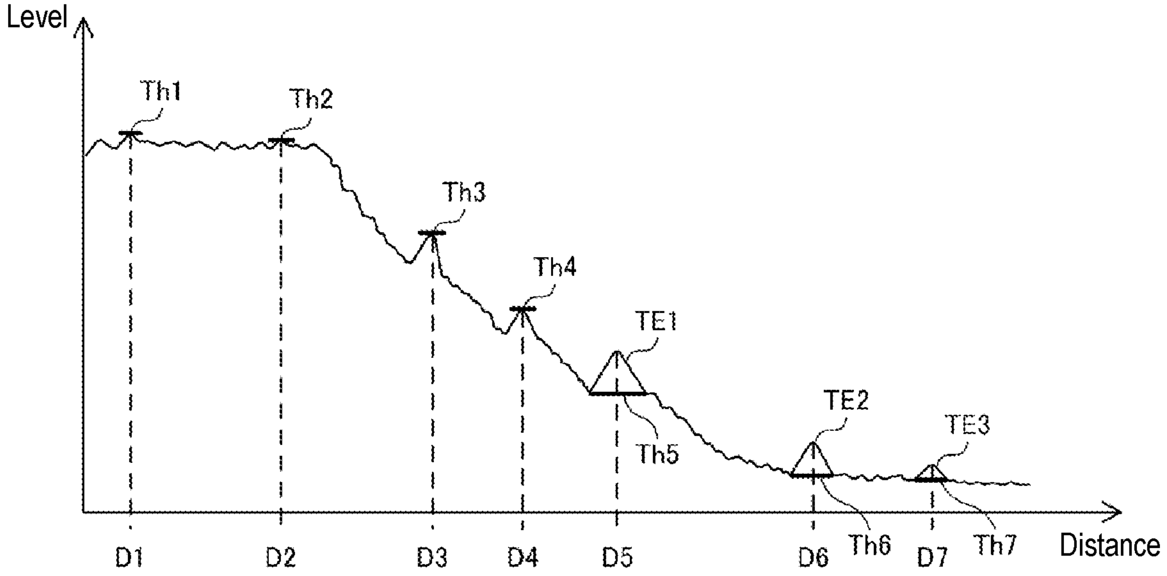
FIG. 5 is a diagram showing an example of threshold values set by the signal processor according to the embodiment of the disclosure.

FIG. 5 is a diagram showing an example of threshold values set by the signal processor according to the embodiment of the disclosure. In FIG. 5, the horizontal axis indicates the distance from the antenna 140, and the vertical axis indicates the level of the echo data.

The signal processor 101 performs the processing shown in FIG. 3 for each distance from the antenna 140, for example, for each sample of the digital signal from the A/D converter 160.

In this way, the threshold value Th, that is, the correction value, may be set according to the echo data at each of the distances. Specifically, referring to FIG. 5, at the distances D5 to D7 where peaks of the targets TE1 to TE3 respectively exist, while setting threshold values Th5 to Th7 that are lower than the peaks so that the peaks are not deleted, threshold values Th1 to Th7 capable of suppressing the main bang may be set for each of the distances D1 to D7. Further, threshold values Th3 and Th4 that may remove peaks other than the target due to device or circuit specific characteristics may be set at distances D3 and D4, respectively.

In other words, since a target such as a ship exists in a specific direction, by setting the minimum value of the reception level for one scan as the threshold value Th, the main bang and other noise components may be suppressed without erasing the peak due to the target TE.

Moreover, the level of the main bang has different values depending on the distances, such as the distances D1 to D4. Therefore, it is possible to satisfactorily suppress the main bang by obtaining and correcting the threshold value Th for each of the distances.

Flow of operation

A radar device according to an embodiment of the disclosure includes a computer including a memory, and an arithmetic processor such as a central processing unit (CPU) in the computer reads a program including part or all of the steps of the following flowchart and sequences from the memory and executes the program. The program may be installed externally. The program is distributed in a state stored in a recording medium or via a communication line.

Figure 6:
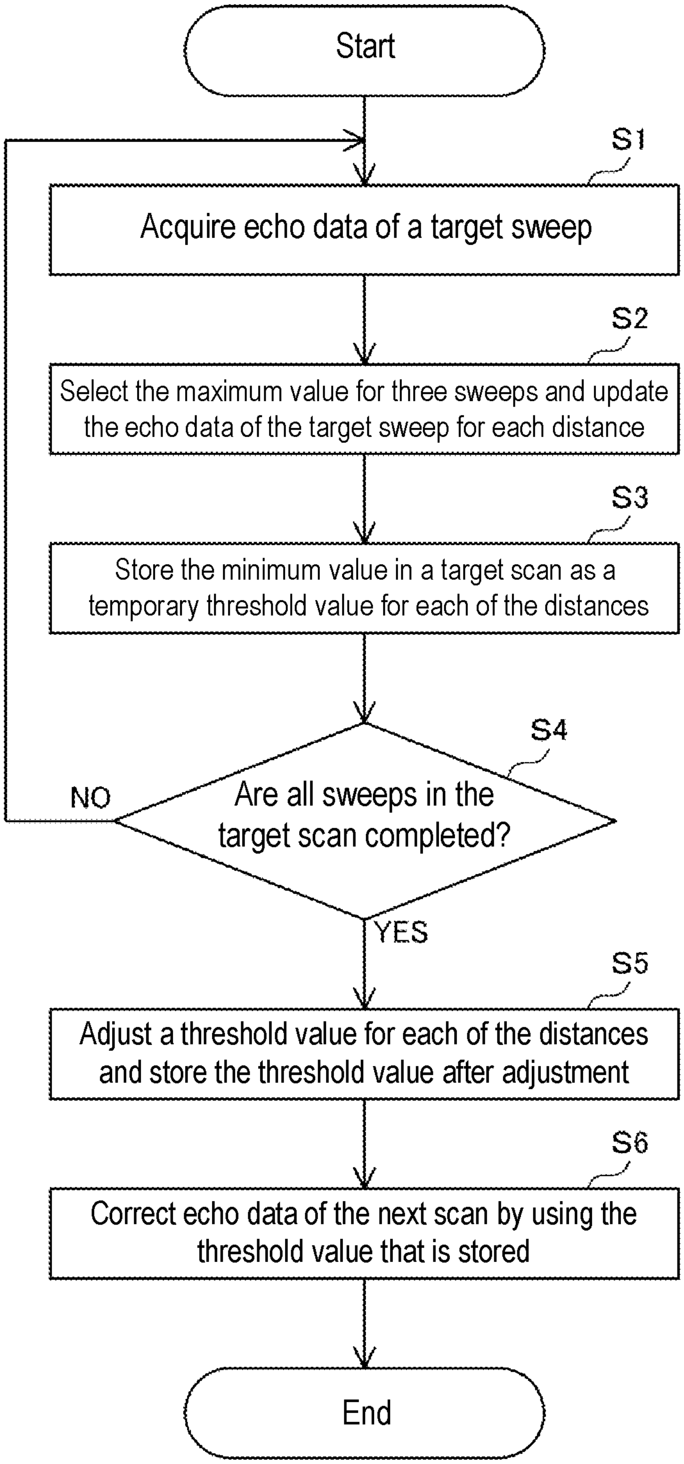
FIG. 6 is a flowchart defining an example of an operation procedure when the signal processor corrects echo data according to the embodiment of the disclosure.
Figure 7:
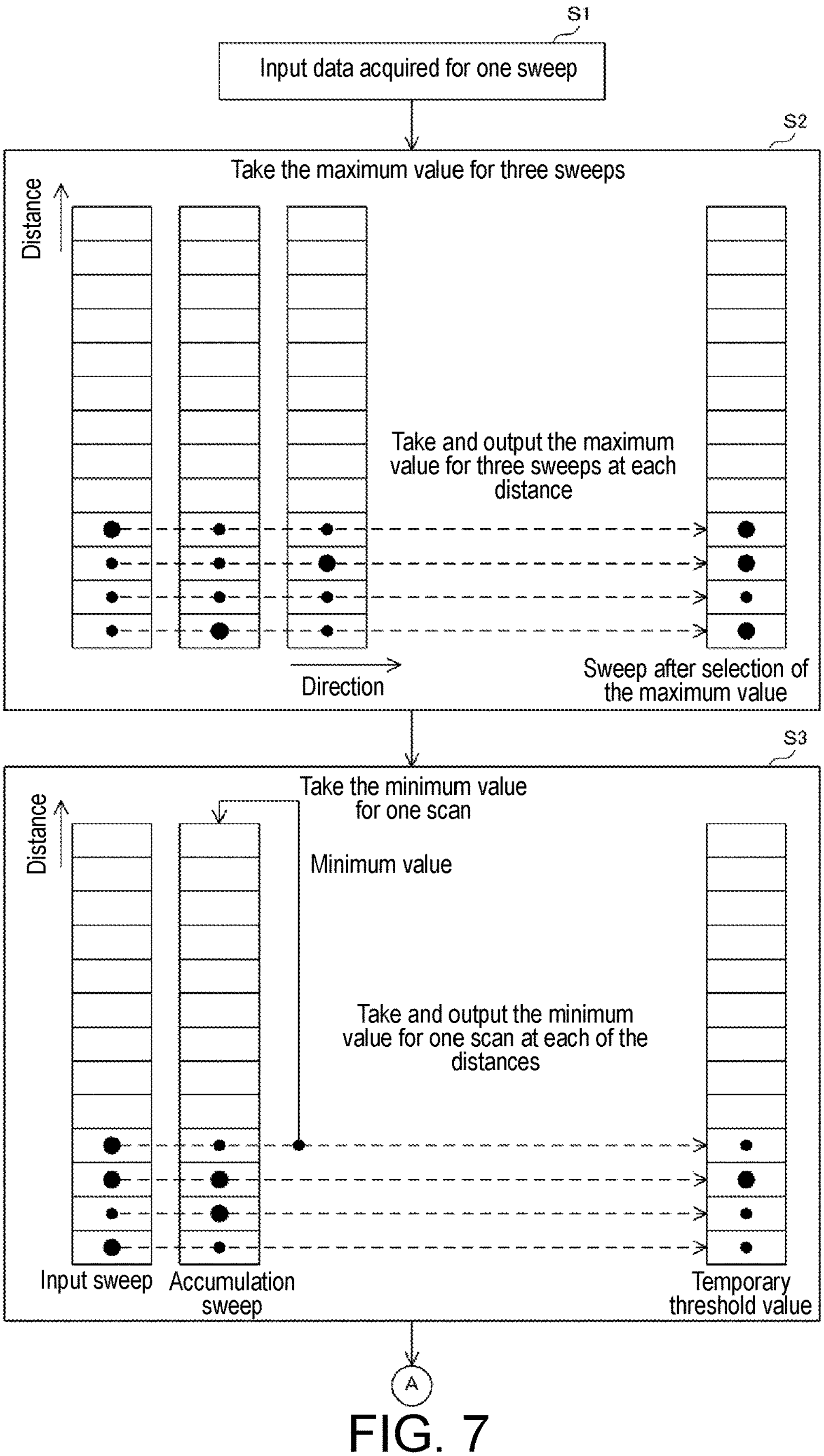
FIG. 7 is a diagram for explaining the processing contents of each step in FIG. 6.
Figure 8:
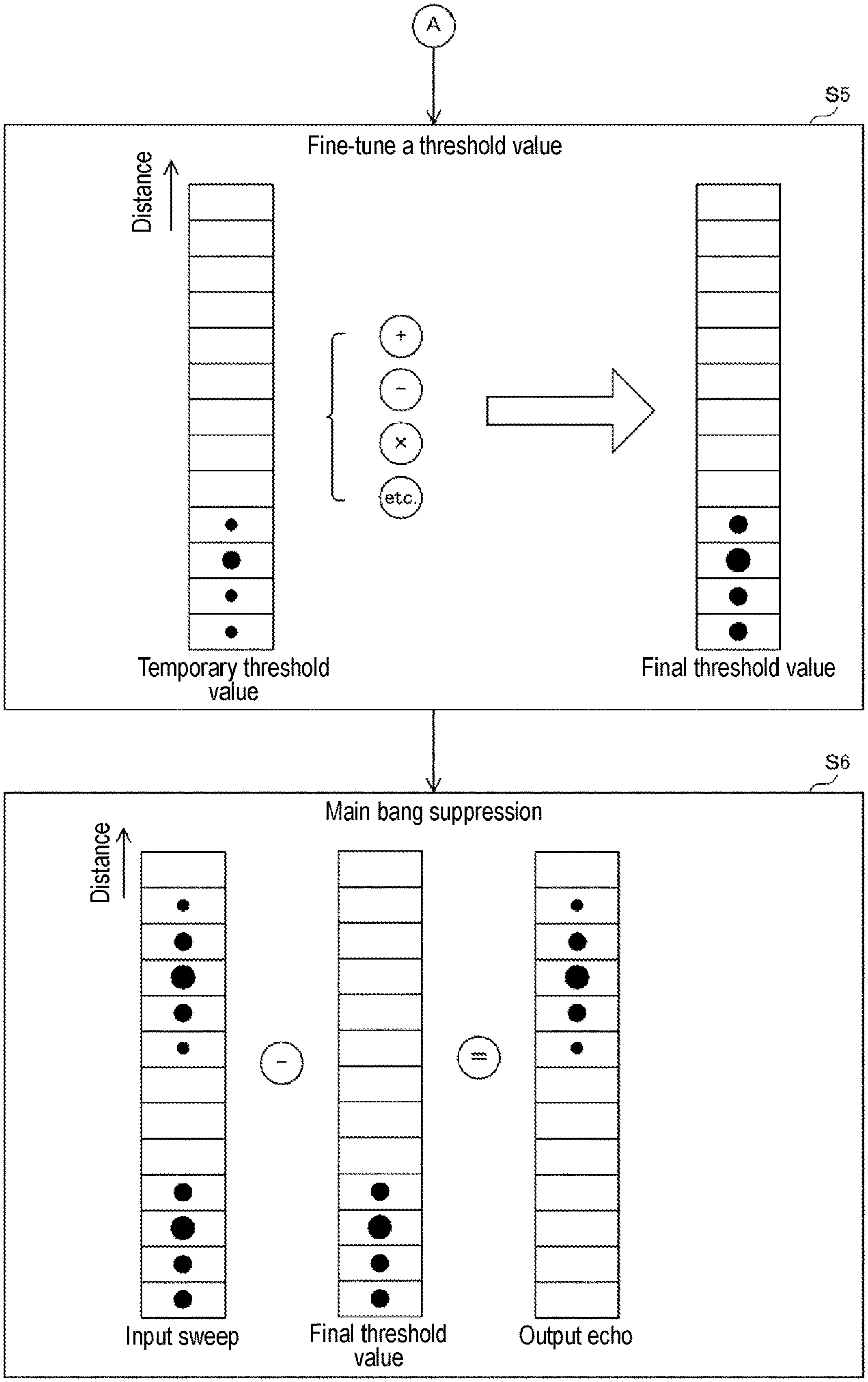
FIG. 8 is a diagram for explaining the processing contents of each step in FIG. 6.

FIG. 6 is a flowchart defining an example of an operation procedure when the signal processor corrects echo data according to the embodiment of the disclosure. FIGS. 7 and 8 are diagrams for explaining the processing contents of each step in FIG. 6.

Referring to FIGS. 6 to 8, first, the correction value calculator 2 acquires echo data of the target sweep from the storage part 4 (step S1).

Next, the correction value calculator 2 compares the reception level of the target sweep with the reception levels of the sweeps before and after the target sweep for each of the distances D from the antenna 140 and updates the echo data so that the maximum value of each of the reception levels becomes the reception level of the target sweep. In more detail, the correction value calculator 2 stores the maximum value in an area corresponding to the target sweep in the storage part 4 (step S2).

Next, the correction value calculator 2 stores the minimum value up to the target sweep in a target scan as a temporary threshold value for each of the distances D from the antenna 140. In more detail, the correction value calculator 2 compares a stored maximum value with the temporary threshold value in the storage part 4, and stores the value that is smaller as a new temporary threshold value. Here, when processing the echo data of an initial sweep of the target scan, the correction value calculator 2 stores the stored maximum value as it is as a new temporary threshold value. Therefore, the threshold value is reset for each scan, and the minimum value for each of the scans may be obtained as the threshold value (step S3). It should be noted that the configuration may be such that the threshold value is not reset for each scan, but is reset for each particular number of scans.

Next, when the processing for all sweeps in the target scan is not completed (NO in step S4), the correction value calculator 2 acquires echo data of the next sweep, that is, at the next direction (step S1), and performs the above-described processing (steps S2 and S3).

On the other hand, when the processing for all the sweeps in the target scan is completed (YES in step S4), the correction value calculator 2 fine-tunes the threshold value for each of the distances by performing a particular calculation on the temporary threshold value, and the value after adjustment is stored in the storage part 4 as the threshold value Th. That is, the correction value calculator 2 obtains the minimum value of the level indicated by the received data in all directions of the rotation of the antenna 140 for each of the distances D, and calculates a value based on the minimum value as the correction value (step S5).

Next, the suppressor 3 uses the correction value to suppress the level indicated by the received data from the next scan of the scan corresponding to the correction value. In more detail, the suppressor 3 uses the correction value, that is, the threshold value Th, stored in the storage part 4 to suppress the level indicated by the received data obtained by the rotation of the antenna 140 from the next scan of the scan corresponding to the threshold value Th.

For example, the suppressor 3 uses the threshold value Th that is stored to correct the echo data of the next scan. In more detail, the suppressor 3 acquires the threshold value Th obtained from the echo data of the one scan before from the storage part 4, generates echo data with the main bang removed by subtracting the threshold value Th from the echo data of a new scan, and outputs the echo data with the main bang removed to the display processor 202.

Thus, in the signal processor 101, determination of the threshold value Th corresponding to the new scan by the correction value calculator 2 and correction of echo data corresponding to the new scan by the suppressor 3 are performed in parallel (step S6).

It should be noted that the correction value calculator 2 may be configured so as not to generate echo data from which the influence of missing is removed (step S2).

Further, the correction value calculator 2 may be configured to use the temporary threshold value as it is as the threshold value Th without adjusting the temporary threshold value (step S5).

Further, the suppressor 3 is not limited to the configuration of subtracting the threshold value Th obtained from the echo data of the scan one time before from the echo data of the new scan (step S6), and the configuration may be such that the threshold value Th obtained from the echo data of the scan two or more times before is subtracted from the echo data of the new scan.

In addition, the signal processor 101 is not limited to the configuration that performs the parallel processing (step S6) as described above, and the configuration may be such that the echo data corresponding to the new scan may be corrected by the suppressor 3 by using the determined threshold value Th.

Further, the signal processor 101 is not limited to the radar device, and may be installed with a sonar, a fish finder, or the like having a transducer (antenna) that transmits and receives ultrasonic waves to perform the above-described correction processing. That is, regardless of the configuration in which the antenna rotates, any configuration may be employed as long as the correction value calculator 2 calculates the correction value of the strength for each distance from the antenna based on the received signal including the signal obtained by the transmissions and the receptions via the antenna that rotates or does not rotate. It should be noted that the configuration, like a sonar or the like, in which the antenna and the transmitter 120 are the same and the circulator is not provided may be employed.

By the way, in order to reduce the influence of the main bang, for example, the radar device is provided with the circuit that designates the timing and the level and suppresses the received signal at an analog stage, and costs such as cost of parts, circuit area, and management cost of parts increase. Also, in some cases, if the setting of the timing configured to suppress the received signal is incorrect, the main bang may not be well suppressed. Moreover, in some cases, the echoes of targets existing in the vicinity of the antenna are erased.

On the contrary, in the signal processor according to the embodiment of the disclosure, the correction value calculator 2 calculates a correction value of strength for each distance from the antenna, based on the received signal including the signal acquired through the transmissions and the receptions via the antenna. And then, the suppressor 3 uses the correction value for each of the distances D to suppress the level indicated by the received data generated based on the received signal for each of the distances D.

In this way, with the configuration that the correction value of the strength of the received signal for each of the distances from the antenna is calculated, and the level indicated by the received data is suppressed for each of the distances, for example, the provision of the circuit configured to specify the timing and the level to suppress the received signal at the analog stage may be removed, and the costs may be reduced. In addition, the main bang is satisfactorily suppressed, and it becomes easy to set the timing configured to suppress the received signal, that is, the distance from the antenna, so that the echoes of the targets existing in the vicinity of the antenna are not erased. Moreover, since different levels of suppression may be performed for each of the distances, a more ideal suppression result may be obtained.

Therefore, the signal processor according to the embodiment of the disclosure may suppress the increase in costs and reduce the influence of the main bang.

Further, in the signal processor according to the embodiment of the disclosure, the correction value calculator 2 performs statistical processing of the level indicated by the received data for each of the distances D, and calculates the correction value by using the statistical processing results.

With such a configuration, it is possible to prevent an erroneous threshold value from being set due to the failure of outputting the pulse-shaped signal in the transmitter 120 and the missing where sufficient reception levels in some directions of the antenna 140 are not able to be obtained in the echo data of transmission waves.

Further, in the signal processor according to the embodiment of the disclosure, during the statistical processing, the correction value calculator 2 compares the level indicated by the target data, which is the received data of the target, with the levels indicated by the received data of others of which received time is close, replaces the level of the target data with the level higher than the level of the target data, and calculates the correction value by using the level replaced.

With such a configuration, it is possible to prevent an erroneous threshold value from being set due to the missing by a simple process of comparison with the reception levels in other directions and replacement.

Further, in the signal processor according to the embodiment of the disclosure, the correction value calculator 2 obtains the minimum value of the level indicated by each of the received data obtained by the transmissions and the receptions via the antenna 140 for each of the distances D, for example, the level indicated by the received data in all directions of the rotation of the antenna 140, and calculates the minimum value or a value based on the minimum value as the correction value.

In this manner, with the configuration that the minimum value of the reception level for one scan, that is, for one rotation of the antenna 140 is selected for each of the distances and set as the threshold value, even if the setting of a target distance configured to suppress the main bang exceeds the range of the main bang, as the lower limit of a noise level becomes the threshold value at the distance where the main bang does not occur, the peaks of the targets are nearly unsuppressed.

That is, in the configuration provided with the circuit configured to suppress the received signal at the analog stage as described above, a distance range in which the reception level is suppressed is set, so as not to erase the echoes of the targets in the vicinity of the antenna 140. On the contrary, with the configuration as described above, even if the distance to be suppressed is extended, the peaks of the targets do not disappear, and the distance may be easily set. In other words, main bang suppression processing may be performed over a longer distance, and a more ideal suppression result may be obtained.

In addition, in the configuration provided with the circuit configured to specify the timing and the level and suppress the received signal at the analog stage, since a constant level threshold value is subtracted from the received signal in the range to be suppressed, the constant level threshold value is also subtracted in the range where the main bang remains at a low level.

On the contrary, with the configuration that the minimum value in all directions at each of the distances is used as a subtraction value, it is possible to prevent the reception level from being over-suppressed since a suitable threshold value corresponding to the level may be set for subtraction in the range at the low level as described above. Also, the peaks of the targets in the range may be left more reliably.

Further, in the signal processor according to the embodiment of the disclosure, the suppressor 3 uses the correction value to suppress the level indicated by the received data from the next scan of the scan corresponding to the correction value.

With such a configuration, since the echo data may be corrected in parallel with the process of updating the correction value by using the echo data obtained by the new scan, it is possible to generate the latest echo data after correction earlier, and display the echo image, etc.

In addition, in the signal processor according to the embodiment of the disclosure, the received signal includes a signal received by the antenna 140 as a result of reflection of a transmission signal transmitted from the antenna 140.

With such a configuration, in a device that radio waves are transmitted and received via a common antenna, and the main bang is prone to occur, the correction value of the strength of the received signal is calculated for each distance from the antenna, the level indicated by the received data for each of the distances is suppressed, and it is possible to suppress the increase in costs and reduce the influence of the main bang.

Further, in the signal processing method according to the embodiment of the disclosure, first, based on received signals including signals obtained by multiple transmissions and receptions via an antenna, a correction value of strength is calculated for each distance from the antenna. Next, the correction value for each of the distances D is used to suppress the level indicated by the received data generated based on the received signal for each of the distances D.

In this way, the correction value of the strength of the received signal for each distance from the antenna is calculated, the level indicated by the received data for each distance is suppressed, for example, the provision of the circuit configured to specify the timing and the level to suppress the received signal at the analog stage is removed, and thus the costs may be reduced. In addition, the main bang is satisfactorily suppressed, and it becomes easy to set the timing configured to suppress the received signal, that is, the distance from the antenna, so that the echoes of the targets existing in the vicinity of the antenna are not erased. Moreover, since different levels of suppression may be performed for each of the distances, a more ideal suppression result may be obtained.

Therefore, the signal processing method according to the embodiment of the disclosure may suppress the increase in costs and reduce the influence of the main bang.

The above-described embodiments should be considered as illustrative in all respects and not restrictive. The scope of the disclosure is indicated by the scope of the claims rather than the above description, and is intended to include all modifications within the scope and meaning equivalent to the scope of the claims.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A signal processing device, comprising:

a hardware processor programmed to at least:

calculate a correction value of strength for each of distances from an antenna based on a received signal comprising a signal acquired by a plurality of transmissions and receptions via the antenna; and suppress a noise level indicated by received data generated based on the received signal for each of the distances by using the correction value for each of the distances, wherein the received signal is a signal acquired from all directions, wherein the hardware processor is programmed to at least perform statistical processing of the noise level indicated by the received data for each of the distances, and calculate the correction value by using a result of the statistical processing, and wherein in the statistical processing, a noise level indicated by target data, which is the received data of a target, is compared with noise levels indicated by other received data acquired from directions different from a direction of the target data within a predetermined number of sweeps from received time of the target data, the noise level of the target data is replaced with a maximum noise level among the noise levels indicated by the other received data, and the replaced noise level of the target data is used to calculate the correction value.

2. The signal processing device according to claim 1, wherein the hardware processor is programmed to at least obtain a minimum value of the noise level indicated by the received data acquired by the plurality of transmissions and receptions for each of the distances, and calculate the minimum value or a value based on the minimum value as the correction value.

3. The signal processing device according to claim 1, wherein the hardware processor is programmed to at least use the correction value obtained from a first scan to suppress a noise level indicated by the received data from a second scan next to the first scan.

4. The signal processing device according to claim 3, wherein the antenna rotates to acquire the received signal from all directions.

5. The signal processing device according to claim 1, wherein the antenna rotates to acquire the received signal from all directions.

6. A radar device, comprising:

the signal processing device according to claim 1;

the antenna;

a transmitter, transmitting a transmission signal via the antenna;

a receiver, receiving the received signal comprising a reflected wave of the transmission signal; and an analog to digital (A/D) converter, converting the received signal into a digital signal and outputting the digital signal to the hardware processor.

7. A signal processing method, in a signal processing device, comprising:

calculating a correction value of strength for each of distances from an antenna based on a received signal comprising a signal acquired by a plurality of transmissions and receptions via the antenna; and suppressing a noise level indicated by received data generated based on the received signal for each of the distances by using the correction value for each of the distances, wherein the received signal is a signal acquired from all directions, wherein the signal processing method further comprises:

at least performing statistical processing of the noise level indicated by the received data for each of the distances, and calculating the correction value by using a result of the statistical processing, wherein in the statistical processing, a noise level indicated by target data, which is the received data of a target, is compared with noise levels indicated by other received data acquired from directions different from a direction of the target data within a predetermined number of sweeps from received time of the target data, the noise level of the target data is replaced with a maximum noise level among the noise levels indicated by the other received data, and the replaced noise level of the target data is used to calculate the correction value.

8. A non-transitory recording medium recording a signal processing program, used in a signal processing device, the signal processing program causing a computer to execute:

a process of calculating a correction value of strength for each of distances from an antenna based on a received signal comprising a signal acquired by a plurality of transmissions and receptions via the antenna; and a process of suppressing a noise level indicated by received data generated based on the received signal for each of the distances by using the correction value for each of the distances, wherein the received signal is a signal acquired from all directions, wherein the signal processing program further causes the computer to execute:

at least performing statistical processing of the noise level indicated by the received data for each of the distances, and calculating the correction value by using a result of the statistical processing, wherein in the statistical processing, a noise level indicated by target data, which is the received data of a target, is compared with noise levels indicated by other received data acquired from directions different from a direction of the target data within a predetermined number of sweeps from received time of the target data, the noise level of the target data is replaced with a maximum noise level among the noise levels indicated by the other received data, and the replaced noise level of the target data is used to calculate the correction value.

* * * * *